United States Patent [19]

Wagstaff et al.

[11] Patent Number: 5,724,797
[45] Date of Patent: Mar. 10, 1998

[54] CROP GUIDE FOR FORAGE HARVESTER ROW CROP ATTACHMENT

[75] Inventors: Robert A. Wagstaff, Lancaster; Larry D. Hall, New Holland, both of Pa.

[73] Assignee: New Holland North America, Inc., New Holland, Pa.

[21] Appl. No.: 770,070

[22] Filed: Dec. 19, 1996

Related U.S. Application Data

[60] Provisional application No. 60/009,168, Dec. 21, 1995.

[51] Int. Cl.$^6$ .......................... A01D 45/02; A01D 45/10
[52] U.S. Cl. ................................ 56/53; 56/102; 56/119; 56/DIG. 17
[58] Field of Search .................................. 56/51, 52, 53, 56/119, 94, 101, 102, DIG. 17

[56] References Cited

U.S. PATENT DOCUMENTS

| | | | |
|---|---|---|---|
| Re. 31,063 | 10/1982 | Greiner et al. | 56/98 |
| 3,939,354 | 1/1976 | Borderie | 56/94 |
| 4,084,396 | 4/1978 | Fritz et al. | 56/98 |
| 4,539,799 | 9/1985 | Kalverkamp | 56/98 X |
| 4,567,717 | 2/1986 | Manton | 56/119 |
| 4,594,842 | 6/1986 | Wolters et al. | 56/94 |
| 4,622,804 | 11/1986 | Krone et al. | 56/13.9 |
| 4,926,623 | 5/1990 | Fiener | 56/60 |
| 5,237,804 | 8/1993 | Bertling | 56/60 |

Primary Examiner—Terry Lee Melius
Assistant Examiner—Heather Shackelford
Attorney, Agent, or Firm—Frank A. Seemar; Larry W. Miller; J. William Stader

[57] ABSTRACT

A forage harvester row crop attachment including a main frame adapted to be attached to a field traversing forage harvester having a crop inlet. An auger, mounted on the main frame generally transverse to the direction of travel of the forage harvester, comprises a tube and flighting mounted on the tube for engaging the upper portion of standing row crops as the forage harvester traverses the field. A transverse cutting assembly, mounted below the auger, has cutting device for cutting the lower portion of standing row crops. Also mounted below the auger are elements for engaging the lower portion of the stalks in cooperation with the auger flighting under conditions where the auger is rotated in a direction that urges the crop material downwardly and inwardly. After the crop is cut it is urged rearwardly by the auger toward a crop outlet in the floor of the attachment adjacent the inlet in the harvester on which the attachment is mounted. Intermediate the crop engaging elements and the floor are crop grasping elements that cooperate with the auger to grasp the lower portion of the crop material before, during and after cutting takes place.

11 Claims, 4 Drawing Sheets

CROP GUIDE FOR FORAGE HARVESTER ROW CROP ATTACHMENT

CROSS REFERENCE TO RELATED APPLICATION

This application claims the benefit of U.S. Provisional Application No. 60/009,168, filed Dec. 21, 1995.

FIELD OF THE INVENTION

The present invention relates generally to forage harvesters headers and more particularly to a crop guide for a header that randomly cuts spaced standing row crop material and conveys it to a base unit for processing.

BACKGROUND OF THE INVENTION

A typical forage harvester operating in matured crops growing in rows, such as corn or the like, includes a mobile base unit and a row crop header attached to the base unit for cutting, gathering, and conveying crop material rearwardly to the base unit. The base unit includes a forward generally rectangular inlet opening for receiving crop material being conveyed rearwardly, a feeding assembly spanning the width of the inlet opening to engage the conveyed crop material, and a crop processor including a rotating cutterhead for receiving crop material from the feeding assembly and chopping it into small pieces, which constitutes the end product that is transferred to a wagon for transport to a storage facility, such as a silo.

The header attachment is mounted on the front of the base unit and has a rear, generally centrally located discharge outlet in communication with the inlet opening on the base unit. As is well known, the stalks of the row crop being harvested are cut near the ground by a cutting assembly on the header attachment, after which the cut crop is gathered and delivered rearwardly through the central discharge outlet and into the feeding assembly on the base unit. During the time the crop material is being conveyed the stalks are manipulated by the gathering and feeding means in a manner such that the cut ends of the stalks of the crop material, or stalk butts, are presented first to the feeding assembly. Thus, the crop material is fed, stalk butts first, to the cutterhead by the feeding assembly, which commonly comprises one or more pairs of feed rolls mounted transversely across the inlet of the base unit.

It is not uncommon for an operator of a forage harvester to be confronted with different spacing between the rows of standing crop as he moves from one field to another. Furthermore, non uniform row spacing may be encountered in the same field during successive passes due to adverse planting conditions, unreliable row spacing, integrity of the planting apparatus, etc. Unless the operator somehow compensates for such differences the standing crops are not likely to be aligned properly with the header stalkways that guide the crop rearwardly in typical row crop attachments.

Various efforts have been made in the past to overcome this problem. For example, the areas between the leading portions of adjacent crop receiving elements have been enlarged and extended forwardly to engage and urge standing crops to the cutters regardless of row spacing. This type of apparatus tends to be ineffective under conditions where there are wide variations between row spacing and is also undesirable due to the additional bulk.

Other attempts to solve the problem involve the utilization of units in which the crop passages are laterally adjustable, such as shown for exemplary purposes in U.S. Reissue Pat. No. Re. 31,063, issued Oct. 26, 1982 in the name of James g. Greiner et al, and U.S. Pat. No. 4,084,396, issued Apr. 18, 1978 in the name of David P. Fritz et al.

Another approach in the past has been to provide a row crop attachment that is not sensitive to the spacing of standing crop material regardless of distance between the rows. Examples of apparatus of this nature are shown in U.S. Pat. Nos. 4,622,804, issued Nov. 18, 1986 in the name of Bernard Krone et al, and 4,926,623, issued May 22, 1990 in the name of Josef Fiener. In Krone et al, a chain driven mechanism is operative transverse to the direction of travel to cut standing crop and convey it transversely to a chopping assembly. The Fieher patent discloses apparatus in which a pair of counter rotating cutting assemblies engage stalk-like crops independently of row spacing and employ opposing truncated cone members to guide the cut crop material rearwardly to a centrally located chopper.

U.S. Pat. Nos. 4,594,842, issued Jun. 17, 1986 in the name of Norbert Walters et al, and 5,237,804, issued Aug. 4, 1993 in the name of Alfred Bertling, are further examples of prior art forage harvester row crop attachments that are not sensitive to the spacing between the rows of standing crop being harvested. In these patents, assigned to a common assignee, pairs of counter rotating cutting assemblies operate in a manner similar to the above discussed Fiener patent. In the first instance the counter rotating cutting assemblies cooperate with opposed sloping conveyor drums, forward of processor feed rolls, while in the latter instance there are no means intermediate the cutting assemblies and the processor feed rolls.

These efforts in the past to solve the problem of providing forage harvester row crop attachment apparatus that accommodates randomly spaced crops, have either resulted in mechanisms that require time consuming and inconvenient mechanical adjustments or have yielded solutions fraught with difficulties spawned by complex endeavors to provide an acceptable solution.

SUMMARY OF THE INVENTION

An important object of the present invention is to overcome the problems mentioned above and provide simple and reliable forage harvester row crop attachment apparatus that results in enhanced performance.

In pursuance of this and other important objects the present invention contemplates an improved forage harvester row crop attachment for a field traversing forage harvester having a crop inlet for receiving cut row crop material having a lower stalk portion and an upper portion. The row crop attachment includes a main frame adapted to be attached to the forage harvester, the main frame having a crop outlet located adjacent the crop inlet for receiving cut row crop material, and, a rotatable auger mounted on the main frame generally transverse to the direction of travel of the forage harvester and forwardly of the crop outlet. The auger comprises a tube and flighting mounted on the tube for urging the upper portion of standing row crop material downwardly and inwardly, as the forage harvester traverses a field in which rows of crop are standing. The row crop attachment further comprises a transverse cutting assembly mounted below the auger, the cutting assembly including cutting means for cutting the lower stalk portion of the standing row crops, and stalk engaging elements for engaging the lower stalk portion, the stalk engaging elements being mounted below the auger and forward of the cutting assembly for cooperating with the flighting to guide the lower stalk portion of the standing row crop to the cutting means under conditions where the auger is rotated in a direction to urge the crop material downwardly and inwardly toward the crop inlet. More particularly the improvement contemplates means for grasping the lower portions of the standing row crop under conditions where the stalk engaging elements are cooperating with the flighting to guide the lower portions of the standing row crop to the cutting means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
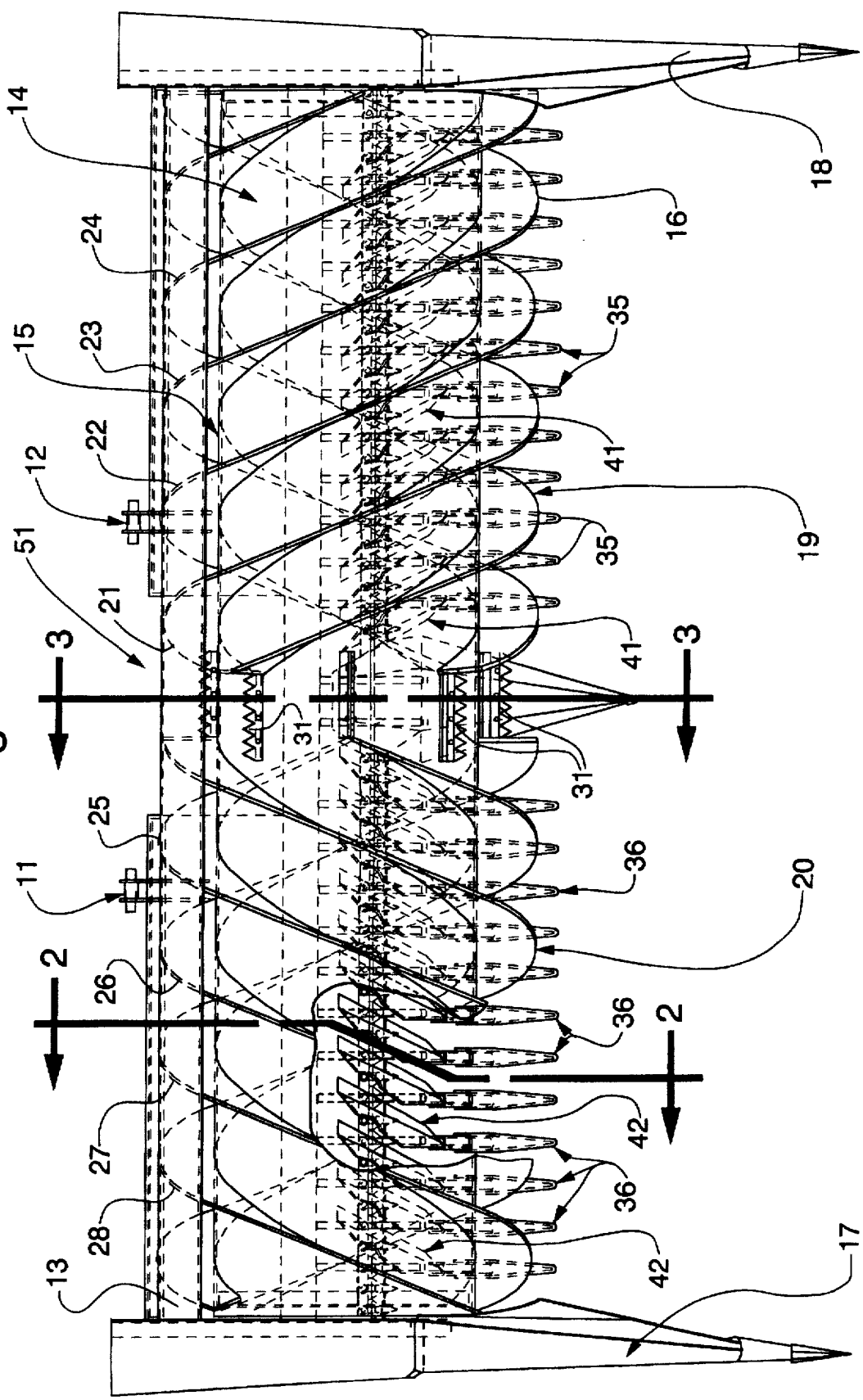
FIG. 1 is a plan view of a forage harvester attachment, in which a portion is cut away to show the preferred embodiment of the present invention.

Referring now to the drawings for a more detailed description of the present invention, FIG. 1 shows a top view of a forage harvester row crop attachment, generally designated by reference numeral 10, in which the invention is embodied. Attachments of this type are generally referred to as forage harvester headers.

Figure 2:
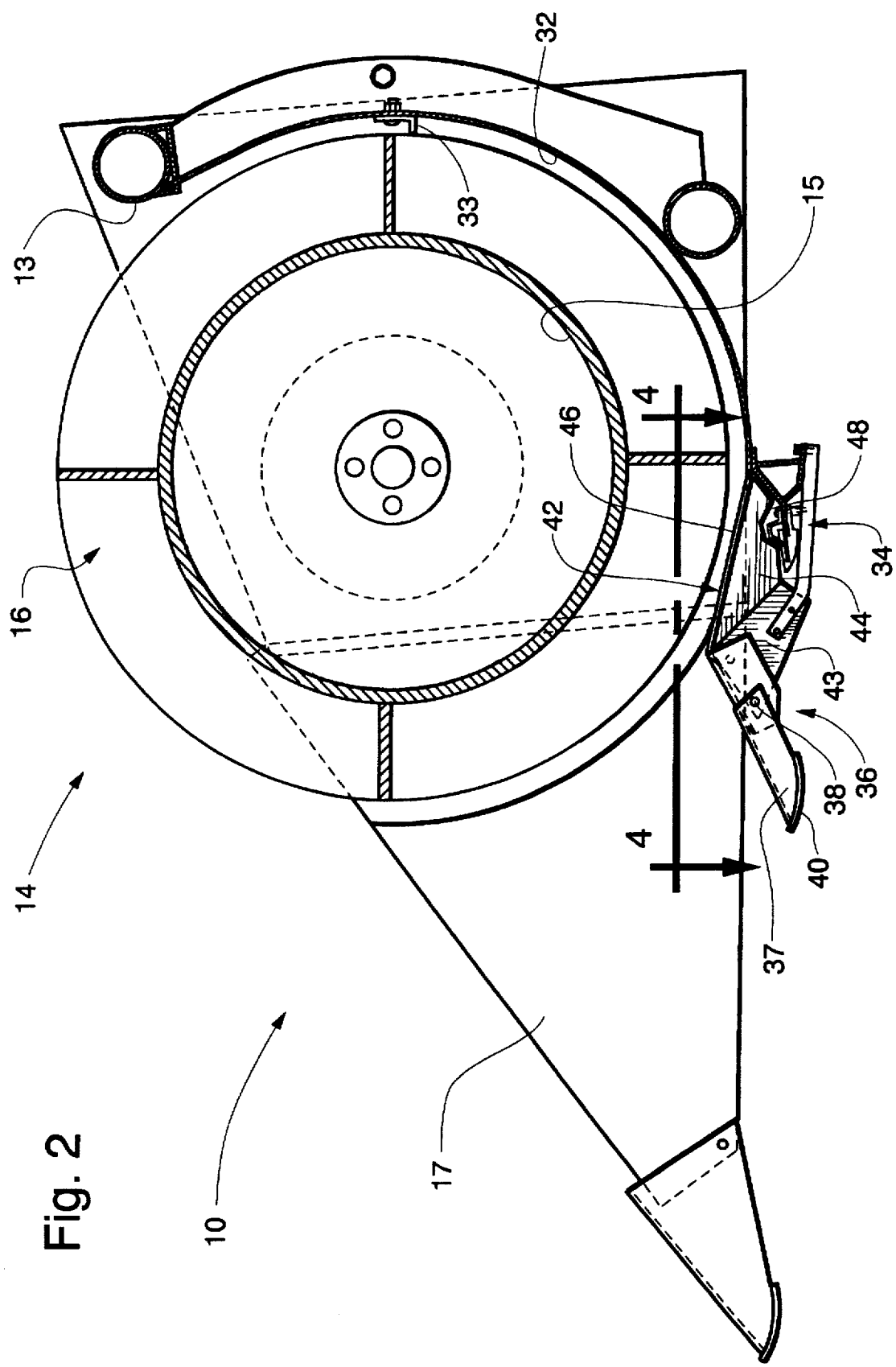
FIG. 2 is a view taken in the direction of arrows 2—2 in FIG. 1.
Figure 3:
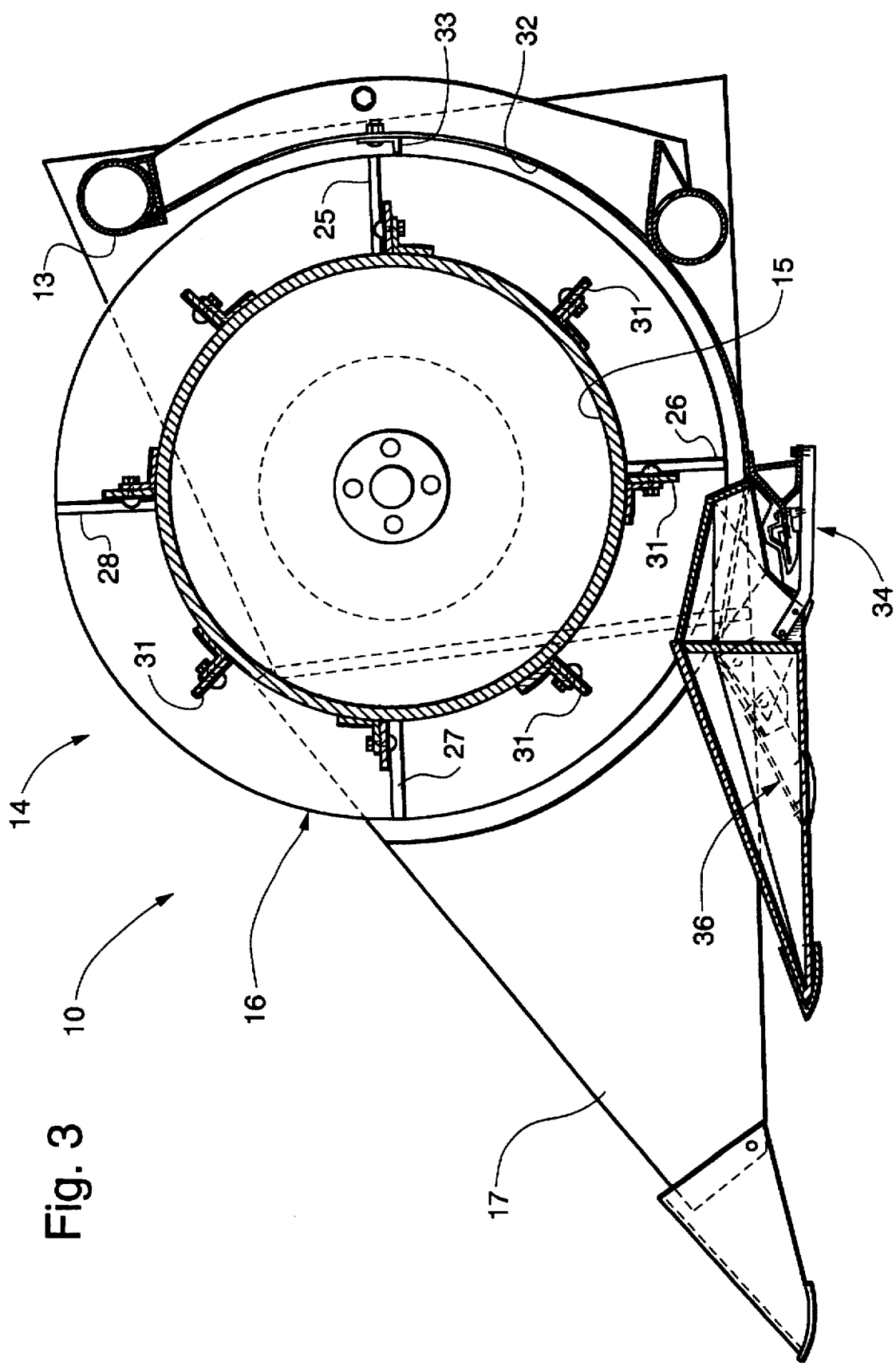
FIG. 3 is a view taken in the direction of arrows 3—3 in FIG. 1.

Attachment 10, adapted for mounting on a forage harvester base unit via mounting brackets 11, 12, comprises a main frame including a transverse beam 13 and various other structural elements, such as integral bracket assemblies and walls, for supporting the components of the attachment in a known manner. An auger 14, comprising a tube 15 and flighting, generally designated by reference numeral 16, is mounted on the main frame transversely between outer crop dividers 17 and 18. A drive assembly, typically consisting of belts, chains and/gearing, (not shown) is mounted on the main frame in a conventional manner for rotating auger 14 in a counterclockwise direction when viewing the attachment from the left as shown in FIGS. 2 and 3.

Auger 14 has left and right sections 19, 20 (taken in reference to the direction of travel) on each of which sections flighting 16 has four similar segments 21, 22, 23, 24 and 25, 26, 27, 28, respectively, affixed at equally spaced locations. The flighting on section 19 is wound in opposition to the flighting on section 20, with the inward ends terminating on tube 15 rearwardly of a centrally located divider 30 affixed to the frame. The inward ends of segments 25, 26, 27, 28 of right section 20 terminate at 90 degree intervals as shown in FIG. 3, while the inward ends of segments 21, 22, 23, 24 of left section 19 terminate in axially spaced relation and staggered with respect to the segments on the right section. A plurality of serrated feed elements 31 are attached to tube 15 between the inward ends of the flighting segments. Elements 31 are staggered axially and each one is affixed adjacent the inward end of a flighting segment.

A semi circular floor 32 is mounted on the frame and extends from transverse beam 13 downwardly and forwardly. Floor 32 is uniformly spaced from the path of the outer edges of flighting 16. Approximately opposite the center of auger tube 15 a scraper 33, having a flange extending in close adjacency with the cylindrical path of the outer edge of flighting 16, is mounted on floor 32.

A standard reciprocating sicklebar cutter assembly 34, extending between the outer crop dividers and below auger 14, is driven in a conventional manner. Forward of sicklebar 34 and below auger sections 19, 20 are a plurality of identical dividers 35, 36, respectively. For the purposes of this description, one of the dividers 36 is shown in detail in FIGS. 2, 4 and 5. It includes a snout 37 pivotable about pivot 38 to adapt skid 40 to accommodate varying terrain conditions.

Figure 4:
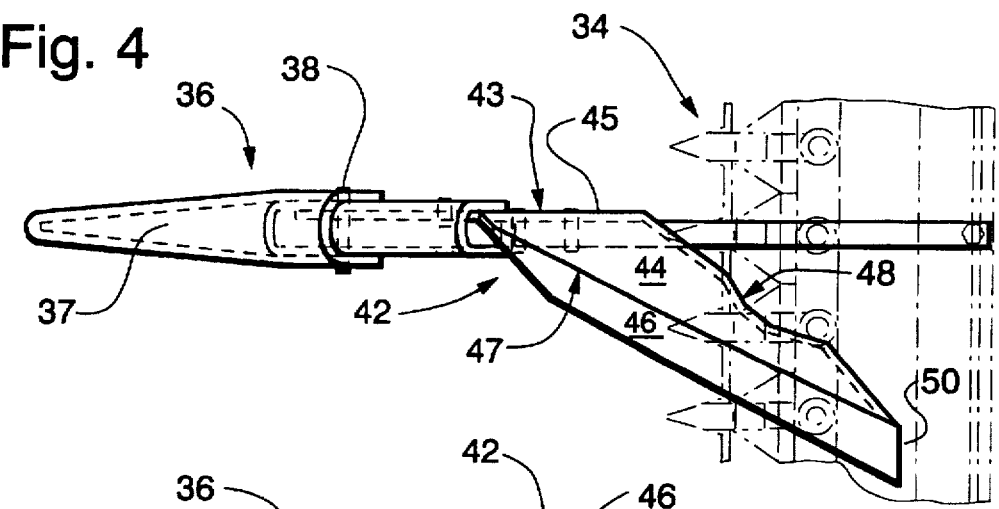
FIG. 4 is a view taken in the direction of arrows 4—4 in FIG. 2.
Figure 5:
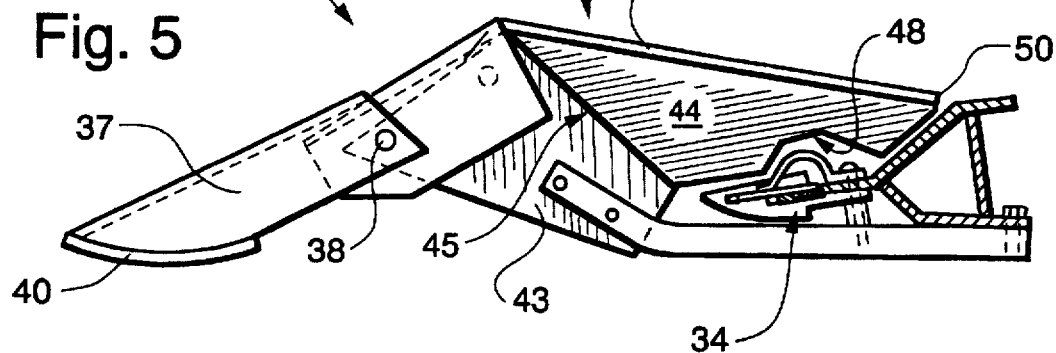
FIG. 5 is a diagrammatical side view showing a crop guide assembly and cutter assembly.

Unique guide elements 41, 42 are mounted rearwardly and in association with each divider 35, 36, respectively. Guide element 42, depicted in FIGS. 2, 4 and 5, is configured as a mirror image of guide element 41, the purpose for which will become apparent in the functional description that follows. The unique guide elements each include three quadrilaterally configured flat surfaces. The first surface consists of a generally vertical surface 43 which is secured to divider 36 and generally aligned therewith to serve as a continuation of its associated divider. Surface 43 is integral with a quadrilateral transition surface 44 at common edge 45, and a third quadrilateral gripping surface 46 is integral with surface 44 and likewise has a common edge 47. Surface 44 is cut away at 48 to accommodate the cutterbar assembly. Of particular significance is the close proximity of gripping surface 46 and edge 47 to the path of the outer edges of the flighting segments, as illustrated by FIG. 2, which is approximately the same spacing as that which is between the floor and flighting. Thus, rear edge 50 of surface 46 terminates in close proximity to the front edge of floor 32 whereupon the spacing or gap between such floor and the cylindrical path of the outer edge of the flighting remains about the same. It should be noted that even though quadrilateral surfaces 43, 44, 46 are flat, non-flat variations in such surfaces could also be utilized.

Figure 6:
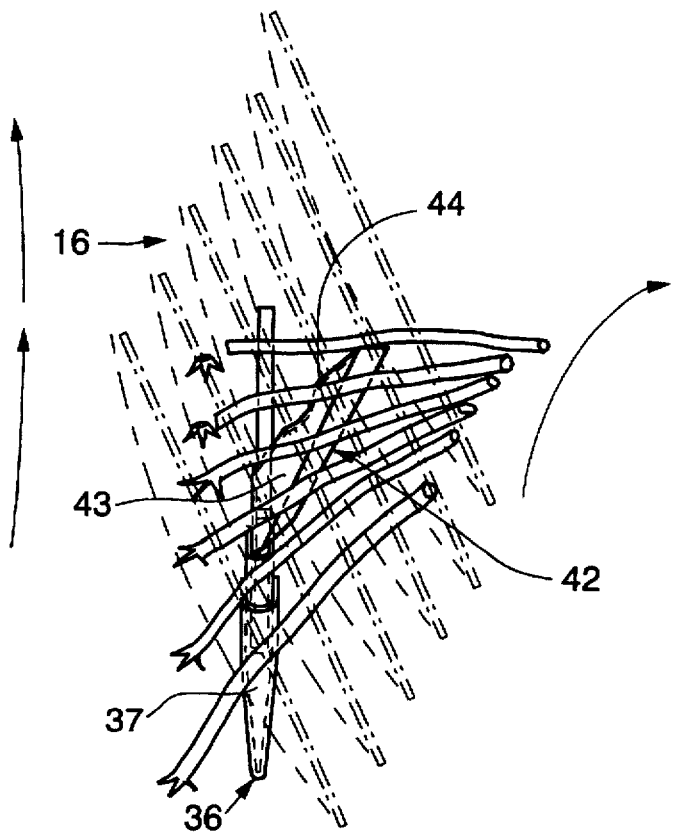
FIG. 6 is a diagrammatical plan view illustrating the relationship between a crop guide assembly and row crop material being harvested.

In operation, standing row crop may be spaced at various distances. Dividers 35, 36 spaced 6 inches apart in the preferred embodiment, are moved forwardly as the harvester and attachment traverse the field during harvesting. The upper portion of the standing crop first engages auger 14, regardless of its transverse position relative to the dividers. As a particular stalk of crop is captured between adjacent dividers the attachment continues forward until such upper portion of the stalk of the standing crop is engaged by the flighting which urges it downwardly and inwardly, while still rooted in the field, i.e., the stalks begin to lean toward the center of the attachment, as illustrated by FIG. 6. Simultaneously, as flighting 16 engages such stalk extending generally upwardly, the tube pushes the upper part of the stalk forwardly. As the attachment and harvester continue to proceed down the field the lower portion of the stalk becomes engaged in the gap between the outer edge of the adjacent flighting and surface 46 of guide element 42 which, by virtue of predetermined spacing the approximate diameter of an average stalk, serves to grip it securely prior to and during cutting by cutting assembly 24. The stalk is so gripped as the flighting continues to urge it downwardly and rearwardly toward the center of the attachment as the top of the stalk is being pushed forward. While cutting takes place the stalk of the crop material is, in effect, laid into position to be conveyed rearwardly and inwardly by the flighting to the crop inlet of the harvester with the butt end of the cut stalk preceding the remainder of the stalk. The spacing between floor 32 and the cylindrical path of the outer edges of the flighting is substantially the same as the gap between the guide elements and the flighting, whereupon the cut stalks are continuously gripped between the floor and the flighting until the butts arrive at a crop outlet 51 in the attachment adjacent the inlet. In the unlikely event that a stalk is not properly fed to outlet 51 in the rear of the floor, scraper 33 will engage the butt and urge it to the center in cooperation with the auger flighting. This is a commonly known aspect of present day augers used in various other applications.

Of the many implicit and explicit advantages of the present invention one of the most important is the provision of a unique design for a crop guide for a forage harvester attachment that utilizes an auger to gather and feed row crop material to a cutting assembly, regardless of the spacing between the rows. It is especially effective in avoiding losses when crop stalks are askew from the normal vertical field condition which thereby contributes to overall forage harvester efficiency by so enhancing general operating characteristics of the attachment.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In a row crop attachment for a field traversing forage harvester having a crop inlet for receiving cut row crop material comprising a lower stalk portion and an upper portion, said row crop attachment comprising a main frame adapted to be attached to said forage harvester, said main frame including a crop outlet located adjacent said crop inlet for receiving cut row crop material, an auger mounted on said main frame generally transverse to the direction of travel of the forage harvester and forwardly of said crop outlet, means for rotating said auger, said auger comprising a tube and flighting mounted on said tube for urging the upper portion of standing row crop material downwardly and inwardly, as said forage harvester traverses a field in which rows of crop are standing, a transverse cutting assembly mounted below said auger, said cutting assembly including cutting means for cutting the lower stalk portion of said standing row crops, and stalk engaging elements for engaging the lower stalk portion, said stalk engaging elements mounted below said auger and forward of said cutting assembly for cooperating with said flighting to guide said lower stalk portion of said standing row crop to said cutting means under conditions where said auger is rotated in a direction to urge the crop material downwardly and inwardly toward said crop inlet, the improvement comprising means for grasping said lower portions of said standing row crop under conditions where said stalk engaging elements are cooperating with said flighting to guide the lower portions of said standing row crop to said cutting means which is located under said auger.

2. A row crop attachment as set forth in claim 1 wherein the outer edge of said flighting travels in a cylindrical path, and said transverse cutting assembly mounted below said auger is rearward of the forwardmost portion of said cylindrical path.

3. In a row crop attachment as set forth in claim 2 wherein said grasping means are operatively associated with said flighting whereby the stalks of the row crop material are continuously grasped subsequent to cutting to aggressively urge said cut crop material in a rearward and inward direction toward said crop inlet.

4. A row crop attachment as set forth in claim 2 wherein said means for grasping is mounted rearward of said stalk engaging elements, for cooperating with said flighting to grasp said lower stalk portions of said crop material.

5. A row crop attachment as set forth in claim 2 wherein said transverse cutting assembly is mounted directly below said auger tube, and said grasping means includes a surface element spaced a predetermined distance from said cylindrical path of said outer edge of said flighting, said surface element disposed between said cutting assembly and said auger for grasping said lower portion of crop material in cooperation with said flighting.

6. A row crop attachment as set forth in claim 5 wherein said predetermined distance is equal to the approximate diameter of a stalk of crop material.

7. A row crop attachment as set forth in claim 6 wherein said stalk engaging elements include a plurality of laterally aligned crop dividers spaced equally across attachment.

8. A row crop attachment as set forth in claim 7 wherein said stalk engaging elements extend forwardly of the flighting of said auger.

9. A row crop attachment as set forth in claim 5 wherein said surface element is above said cutting assembly to grasp said lower portion of said crop material before, during and after cutting.

10. A row crop attachment as set forth in claim 9 and further comprising a floor mounted below and rearwardly of said auger and terminating rearward of said cutting assembly for cooperating with said flighting to guide cut row crop material to said crop outlet.

11. A row crop attachment as set forth in claim 10 wherein said surface element is flat and extends between said stalk engaging elements and said floor.

* * * * *